United States Patent
Jarvis et al.

(10) Patent No.: US 6,615,318 B2
(45) Date of Patent: Sep. 2, 2003

(54) CACHE MANAGEMENT SYSTEM WITH MULTIPLE CACHE LISTS EMPLOYING ROVING REMOVAL AND PRIORITY-BASED ADDITION OF CACHE ENTRIES

(75) Inventors: Thomas Charles Jarvis, Tucson, AZ (US); Steven Robert Lowe, Tucson, AZ (US); Bruce McNutt, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 10/055,633

(22) Filed: Jan. 22, 2002

(65) Prior Publication Data

US 2003/0149843 A1 Aug. 7, 2003

(51) Int. Cl.[7] ................................................. B06F 12/00
(52) U.S. Cl. ....................................................... 711/133
(58) Field of Search ................................. 711/133, 134, 711/135, 136

(56) References Cited

U.S. PATENT DOCUMENTS

| | | | |
|---|---|---|---|
| 4,571,674 A | 2/1986 | Hartung | 711/60 |
| 5,434,992 A | 7/1995 | Mattson | 711/119 |
| 5,627,990 A | 5/1997 | Cord et al. | 711/122 |
| 5,636,359 A | 6/1997 | Beardsley et al. | 711/122 |
| 5,734,861 A | 3/1998 | Cohn et al. | 711/134 |
| 6,012,126 A | 1/2000 | Aggarwal et al. | 711/133 |
| 6,449,695 B1 * | 9/2002 | Bereznyi et al. | 711/134 |

FOREIGN PATENT DOCUMENTS

JP    6052060 A    2/1994 ........... G06F/12/12

OTHER PUBLICATIONS

"Usage Dependent Cache Replacement by Ring Partitioned Groupings", *IBM Technical Disclosure Bulletin*, vol. 15, No. 1, Jun. 1972, pp. 271–274.

"Use of Secondary Address Stack and Multiple Insertion Points for Database Buffer Management Under Least Recently Used Policy", *IBM Technical Disclosure Bulletin*, vol. 36, No. 07, Jul. 1993, pp. 431–432.

"Detection of a Stable Hot Data Set", *IBM Technical Disclosure Bulletin*, vol. 38, No. 11, Nov. 1995, pp. 117–119.

"Der LRU–Algorithmus, seine Realisierung und Anwendung", L. Schubert, *Siemens Forsch.—u. Entwickl.–Ber.*, Bd. 15 (1986) Nr. 2, pp. 91–94.

* cited by examiner

*Primary Examiner*—Reginald G. Bragdon
*Assistant Examiner*—Mehdi Namazi
(74) *Attorney, Agent, or Firm*—Dan Hubert & Assoc.

(57) ABSTRACT

In a cache management system multiple cache lists are utilized, where each entry in a list names at least one corresponding data item in cache. A cache manager always demotes cache list entries from a "current removal list" (and demotes or destages the corresponding data items from cache) until that list is exhausted and another list rotates into the function of current removal list. A prescribed order is established for rotating the role of current removal list. In response to prescribed activities of data items in cache, new cache list entries are added nearer or farther from the current removal list according to the prescribed order and the data items' priorities.

25 Claims, 7 Drawing Sheets

FIGURE 7

CACHE MANAGEMENT SYSTEM WITH MULTIPLE CACHE LISTS EMPLOYING ROVING REMOVAL AND PRIORITY-BASED ADDITION OF CACHE ENTRIES

BACKGROUND OF THE INVENTION

1. Field of the Invention

The present invention relates to cache management systems. More particularly, the invention concerns a cache management system that utilizes multiple cache lists (such as least recently used lists), where a cache manager always removes entries from a "current removal" list (and demotes or destages the corresponding data from cache) until that list is exhausted and another list rotates into the function of current removal list. Depending upon their priority, new cache entries are added nearer or farther from the current removal list in a prescribed order of rotating the role of current removal list.

2. Description of the Related Art

Many different cache memory management systems are being used today. Broadly, "cache" is a special-purpose buffer storage, smaller and faster than main storage, used to hold a copy of those instructions and data likely to be needed next by a processor. Cache is often used to hold frequently accessed instructions and data that reside in slower storage such as disk or tape, thereby reducing access time. Data storage systems with cache therefore operate more efficiently. To run a cache-equipped data storage system at optimal performance, it is crucial to operate the cache as efficiently as possible.

In developing the optimal cache management strategy, there are many different considerations, and planning can get complicated quickly. Therefore, despite great effort in developing new cache management techniques, a number of common problems still exist. For example, many cache management schemes are not as expeditious as possible because, when a decision is made that cached data must be demoted, significant analysis is required to choose the cached data to be demoted. Most cache systems use a least recently used (LRU) or least frequently used (LFU) list as the basis for determining when cache entries are getting stale. A problem can occur, however, when multiple processes try to access cache and its LRU/LFU lists at the same time, since the first (winning) process to access the LRU/LFU list will typically lock the list to exclude other (losing) processes. The losing processes are therefore delayed. Another problem is that some cached data may tend to be removed from the cache prematurely despite the user placing a higher priority on that data relative to other cached data. By the same token, other cached data may reside in cache for an excessive period despite the user placing a lower priority on that data relative to other cached data.

Since customers seek faster and more efficient cache systems, and such products enjoy an advantage in the marketplace, engineers at IBM Corporation are continually researching possible improvements to overcome these and other limitations of known cache management systems.

SUMMARY OF THE INVENTION

Broadly, the present invention concerns a cache management system that utilizes multiple cache lists (such as LRU lists), where a cache manager always removes entries from a "current removal" list (and also demotes their counterparts in cache) until that list is exhausted and another list rotates into the function of current removal list. A separate set of cache lists are utilized for destaging, with the cache manager always removing entries from a different current removal list (and also destaging their counterparts from cache) until that list is exhausted and another list rotates into the function of current removal list. Unlike demotion, destaging does not remove the cache list entries' counterpart data items from cache. In each set of lists (demotion or destaging), new cache entries are made when data items are added to cache, the cache list entries being added nearer or farther from the current removal list (in a prescribed order of rotating the role of current removal list) according to their priority.

To set up the system, the following operations are performed. Initially, a number of cache lists are established to store cache list "entries," each entry naming a data item present in cache storage. A designated sequence is established for progressing through the lists. Initially, one of the lists is designated as a current removal list. Now the system is ready to go. Responsive to a predetermined action condition (such as cache storage becoming full), a cache manager identifies the least recently (or frequently) used cache list entry of the current removal list. In one embodiment, used for cache grooming, the cache manager deletes this cache list entry and updates the cache storage by removing the data item represented by the deleted entry. In another embodiment, used to memorialize old data, the cache manager utilizes a separate set of lists, where a selected cache list entry is removed from the current removal list and its counterpart data item destaged from cache storage to longer term storage. Whenever the current removal list is empty, the cache manager designates the next list in the sequence to be the current removal list.

Whenever a data item is cached, the cache manager adds a cache list entry naming the data item into one of the lists. This is achieved by determining a priority ranking of the data item on a scale having as many levels as the number of the lists (or the number of lists minus one, depending upon whether the current removal list is available for additions); the cache manager adds a cache list entry naming the data item to the list that is spaced in the sequence of progression beyond the current removal list by the number of the priority ranking.

The foregoing features may be implemented in a number of different forms. For example, the invention may be implemented to provide a method of cache management. In another embodiment, the invention may be implemented to provide an apparatus such as a data storage system with a cache managed as described herein. In still another embodiment, the invention may be implemented to provide a signal-bearing medium tangibly embodying a program of machine-readable instructions executable by a digital data processing apparatus to manage cache storage as discussed herein. Another embodiment concerns logic circuitry having multiple interconnected electrically conductive elements configured to manage cache as described herein.

The invention affords its users with a number of distinct advantages. Chiefly, the invention implements a method of managing relative priorities among cached data. This permits the user of the caching subsystem to retain more important data for longer in cache and to demote less important data earlier, thereby using cache storage with optimal efficiency. Similarly, when implemented to manage destaging, this processes permits the user of the caching subsystem to accelerate destaging of certain data (such as critical data) and delay destaging of other data (such as less critical data). As another advantage, the invention is efficient in its cache management, since the decision of the cached data to demote or destage is made rapidly. Namely, when a decision is made to demote/destage, the cache manager need only review the current removal list to identify the cache list entry to demote/destage. Another benefit of the invention is that it reduces lock contention, since there are multiple, individually locked cache lists rather than a single LRU cache list. Thus, even though one application has a lock on a particular cache list, another application may still write to other cache lists. Contention may be further reduced by implementing an optional feature of the invention, where additions are not permitted to the current removal list. Thus, applications seeking to remove a cache list entry do not complete with applications trying to add a cache list entry. The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Data Storage System

One aspect of the invention concerns a data storage system, which may be embodied by various hardware components and interconnections. Broadly, the data storage system of the invention includes one or more hosts, storage media, and a storage management subsystem interposed between the hosts and storage media. Ordinarily skilled artisans will recognize a huge variety of different storage environments within which the present invention may be practiced. One specific example appears in FIG. 1, as shown by the data storage system 100. The system 100 includes one or more hosts 102, a storage subsystem 104, and storage media 116, 117. The storage media of this particular example include direct access storage devices (DASDs) 116 and magnetic tape storage 117.

Figure 1:
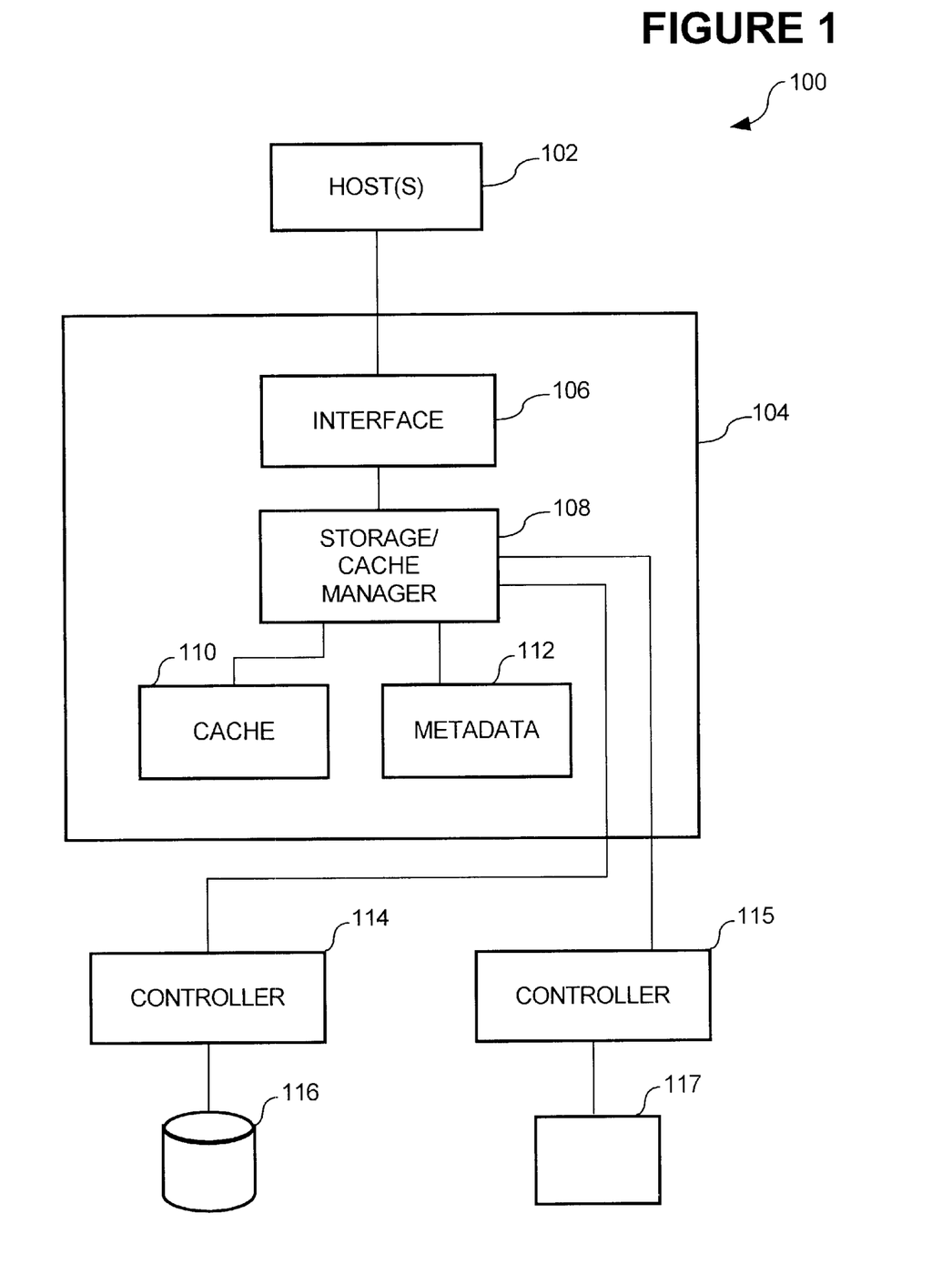
FIG. 1 is a block diagram of the hardware components and interconnections of a storage system according to the invention.

The hosts 102 initiate requests for the storage 116, 117 to conduct Read, Write, or other operations. The hosts 102 also provide source data to be written on the storage 116, 117. Accordingly, the hosts 102 may comprise one or more large or small computers, networked computers, servers, user interface terminals, consoles, communication channels, transceivers, application programs, operating system programs, or other hardware and/or software construct with reason to access the storage 116, 117.

The data storage subsystem 104 performs mid-level tasks to assist in managing the storage 116, 117. For instance, the subsystem 104 may supervise data caching, translation between logical and physical data addresses, hierarchical storage management, data backup, data migration, and other storage management operations. The subsystem 104 includes an interface 106, storage/cache manager 108, cache 110, and metadata 112. The manager 108 comprises a digital data processing machine to implement the functionality of the subsystem 104. Some examples of the manage 108 include a personal computer, computer workstation, microprocessor, application specific integrated circuit (ASIC), computer network, or other computing construct. The interface 106 enables communications between the manager 108 and hosts 102, and may include one or more of the following: communications channel, controller card, bus, wire, fiber optic connector, device driver, or any other interface suitable for the application at hand. The cache 110 comprises storage of any desired type, for use in caching more frequently or recently used data, and thereby expediting storage and/or access of data in the system 100. Although the metadata 112 also comprises storage of any desired type, this component is used to store information about data stored in the cache 110 and storage 116, 117. Exemplary contents of the metadata 112 include inventories, directories, catalogs, cache lists, volume maps, tables of contents, and the like. The cache 110 and metadata 112 may be implemented with various storage types, some examples being discussed below (albeit in a different context) to illustrate various signal-bearing media.

As mentioned above, the storage includes DASDs 116 and magnetic tape storage 117. Many additional or alternative storage types may be used as well, such as optical disk, circuit memory, or any other digital data storage that suits the particular application at hand. As illustrated, the DASD 116 is coupled to a controller 114, and the tape storage 117 is coupled to a controller 115. The controllers 114, 115 receive higher level instructions from the subsystem 104 and convert them into device-level or other rudimentary commands suitable for execution by storage 116, 117.

Metadata

Figure 2:
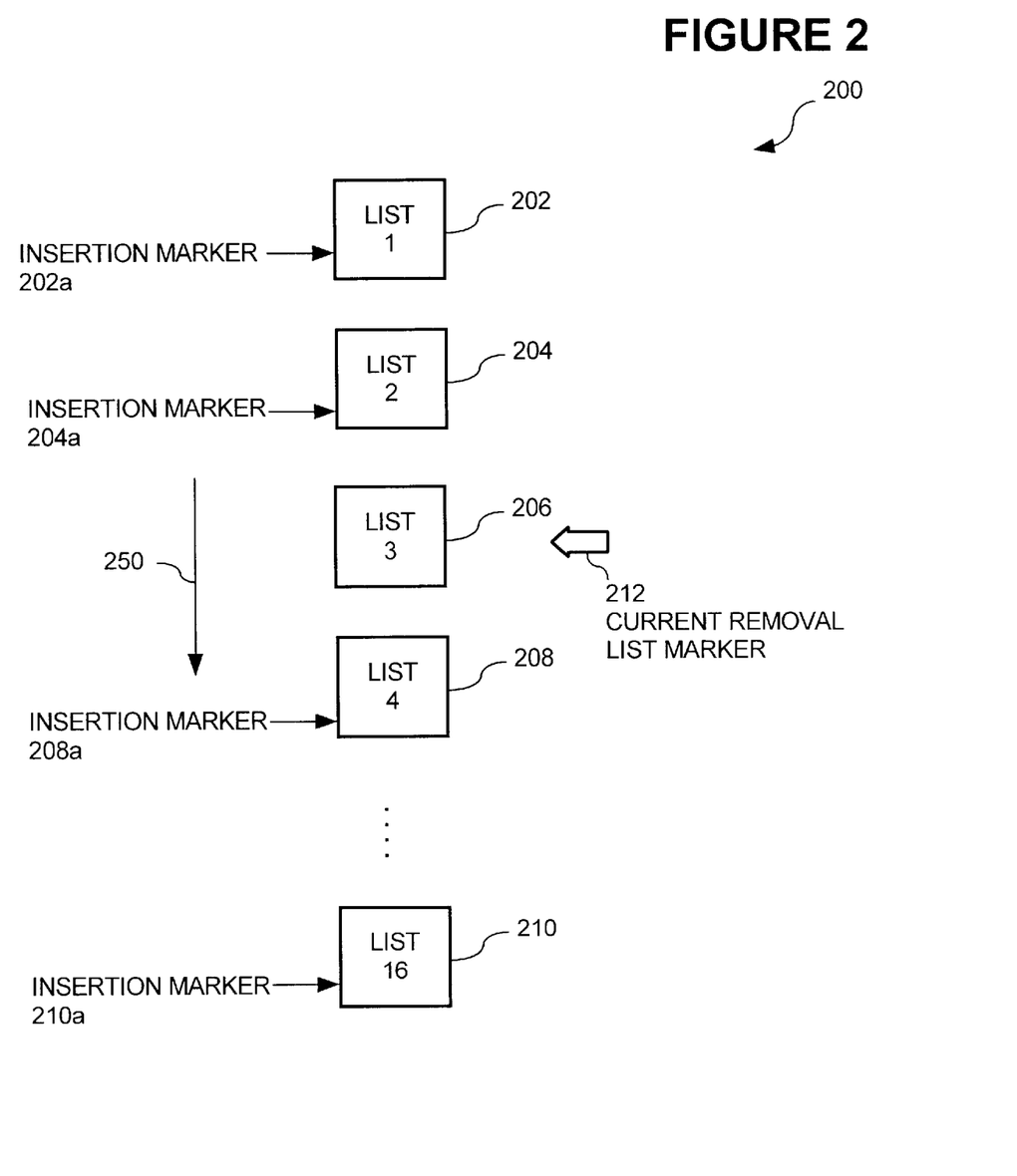
FIG. 2 is a diagram showing several cache lists according to the invention.

To further illustrate some representative contents of the metadata 112, FIG. 2 depicts a number of cache lists 200 including lists 202, 204, 206, 208, 210. For the present discussion, the lists 200 and related markers are utilized to manage demotion of data from cache. A separate set of lists (not shown) and related markers are utilized to manage destaging of data. The present discussion, then, is aimed at the lists and other metadata for use in cache demotion.

During initial setup, reconfiguration, rebooting, installation, or other appropriate times, the manager 108 creates the lists 200. The manager 108, host, customer, operator, or other entity establishes a sequence of progression through the lists 200. In the illustrated example, the sequence of progression advances one list at a time, in the direction 250, sequentially naming a different list as a "current removal list". A current removal list marker 212 shows that the list 206 is the current removal list. According to the sequence 250, the list 208 will become "current" next in sequence after the list 206. As explained in greater detail below, while the list 206 is the current removal list, cache entries of the highest priority are inserted into the list 204 and cache entries of the lowest priority are added to the list 208. As discussed below, pointers or other place markers may optionally be used to mark insertion points for adding new entries in the lists.

Each list may comprise a linked list, table, ASCII text, database, text string, or any other data object that best suits the application at hand. For ease of illustration, the lists are depicted as tables. Each list includes a number of cache list entries, each entry representing an item of data in the cache 110. Depending upon the needs of the application, an "item" of data represented in a list may comprise one or more files, extents, tracks, logical cylinders, logical surfaces, bytes, or any other logical or physical data unit.

Each cache list entry includes (1) an identifier naming the related data item in cache, for example, as a filename, address, extent, or other identifier to a location in cache occupied by the data, and (2) information from which the data item's value in cache may be determined, such as the time of the data item's most recent cache hit (in the case of an LRU list), an indication of how often the data item has received cache hits (in the case of an LFU list), the relative priority of the data item among other cached data items, etc. Cache list entries may include further information as well. For instance, the location of the data item in cache 110 and storage 116, 117 may be shown. As an alternative, rather than incorporating the foregoing information into the cache list entries, the lists 200 may contain pointers to storage locations containing such information.

To provide a more detailed example, TABLE 1 shows exemplary contents of one of the lists 200, implemented in an LRU environment.

TABLE 1

EXEMPLARY CACHE LIST

| NAME OF DATA ITEM | TIME OF MOST RECENT USE | LOCATION OF DATA IN CACHE | LOCATION OF DATA ITEM IN STORAGE 116, 117 |
| --- | --- | --- | --- |
| bearings | 11-01-01, 2 p.m. | ABC8732 | TRACK 472, SECTOR 56 |
| clutches | 10-30-01, 2 p.m. | 5276AB7 | TRACK 497, SECTOR 0 |
| rivets | 10-25-01, 2 p.m. | 92319BB | TRACK 1007, SECTOR 2 |
| rudders | 10-23-01, 2 p.m. | 1222AF2 | TRACK 989, SECTOR 1 |

In the case of LRU lists (as illustrated), one alternative is to omit the "time of most recent use" column from TABLE 1 and to use one or more pointers or other place markers to keep track of the point of insertion for new cache list entries and the point of removal for demoted/destaged cache list entries. To exemplify this approach, FIG. 2 shows insertion markers 202a, 204a, 208a, 210a for the lists 202, 204, 208, 210. In the case of LFU lists, the time of most recent use is replaced with a "frequency of use" column instead.

In addition to the data item's name, time of most recent use, and cache/storage locations, the cache list of TABLE 1 may optionally include a variety of other useful information, such as the priority of the data item relative to other cached data items as determined by the user, for example.

To implement the lists 200 for use in destaging, rather than demotion, similar lists as TABLE 1 may be used. The "time of most recent use" column, however, may be eliminated since this property is not necessary to manage destaging. Instead, a "time when destaged" column may be added to indicate when the data item of that cache list entry was last destaged to storage 116, 117.

Exemplary Digital Data Processing Apparatus

As mentioned above, the manager 108 may be implemented in various forms. As one example, the manager 108 may comprise a digital data processing apparatus, as exemplified by the hardware components and interconnections of the digital data processing apparatus 300 of FIG. 3.

Figure 3:
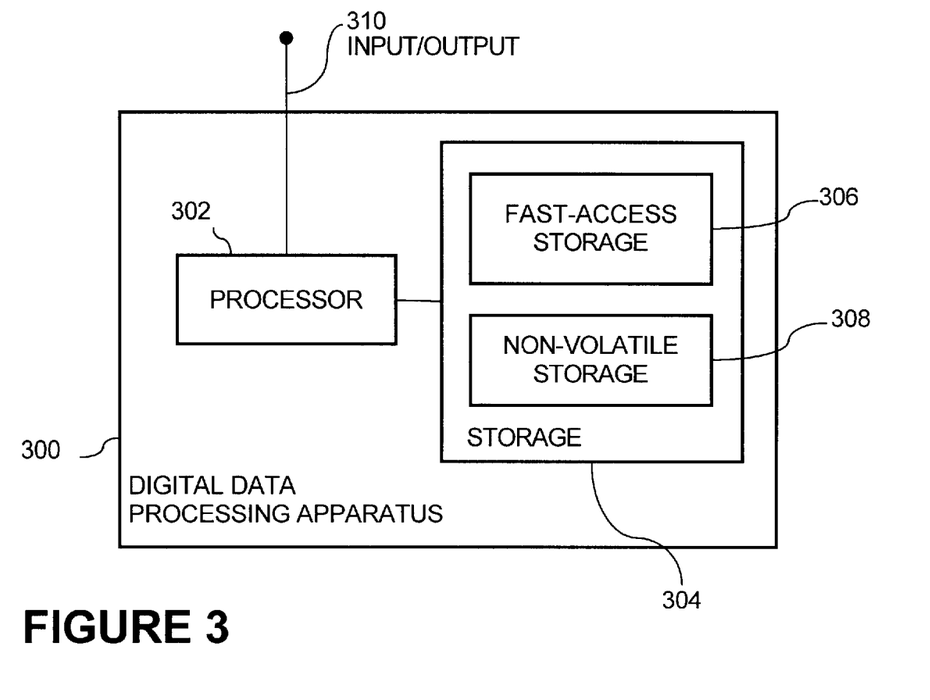
FIG. 3 is a block diagram of a digital data processing machine according to the invention.

The apparatus 300 includes a processor 302, such as a microprocessor, personal computer, workstation, or other processing machine, coupled to a storage 304. In the present example, the storage 304 includes a fast-access storage 306, as well as nonvolatile storage 308. The fast-access storage 306 may comprise random access memory ("RAM"), and may be used to store the programming instructions executed by the processor 302. The nonvolatile storage 308 may comprise, for example, battery backup RAM, EEPROM, one or more magnetic data storage disks such as a "hard drive", a tape drive, or any other suitable storage device. The apparatus 300 also includes an input/output 310, such as a line, bus, cable, electromagnetic link, or other means for the processor 302 to exchange data with other hardware external to the apparatus 300.

Despite the specific foregoing description, ordinarily skilled artisans (having the benefit of this disclosure) will recognize that the apparatus discussed above may be implemented in a machine of different construction, without departing from the scope of the invention. As a specific example, one of the components 306, 308 may be eliminated; furthermore, the storage 304, 306, and/or 308 may be provided on-board the processor 302, or even provided externally to the apparatus 300.

Logic Circuitry

In contrast to the digital data processing apparatus discussed above, a different embodiment of the invention uses logic circuitry instead of computer-executed instructions to implement the manager 108. Depending upon the particular requirements of the application in the areas of speed, expense, tooling costs, and the like, this logic may be implemented by constructing an ASIC having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the operational aspect of the present invention will now be described. As mentioned above, the operational aspect of the invention generally involves the use of multiple cache lists, where cache list entries are always removed from a current removal list until that list is exhausted and another list rotates into the function of current removal list. Corresponding cache data is demoted or destaged from cache when the removal occurs. Depending upon their priority, new cache list entries are added nearer or farther from the current demotion list in a prescribed order of rotating the role of current removal list.

Signal-Bearing Media

Figure 4:
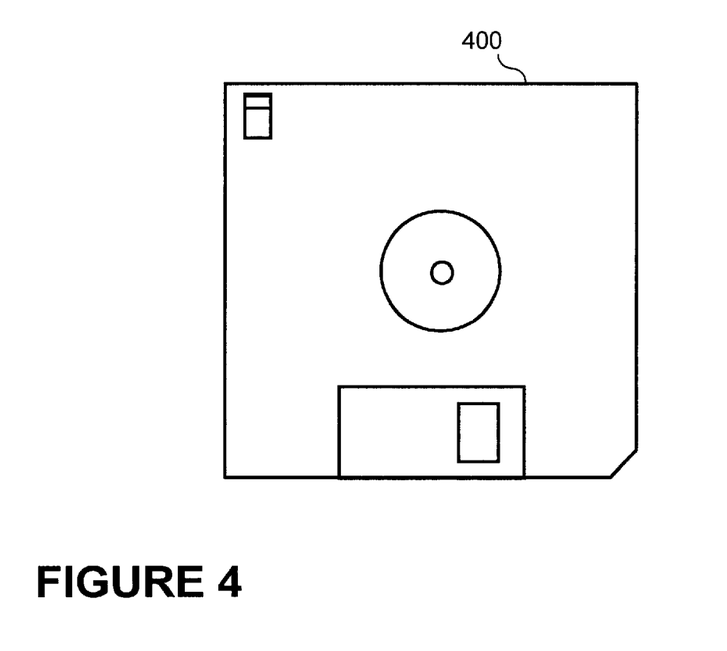
FIG. 4 shows an exemplary signal-bearing medium according to the invention.

Wherever the functionality of the invention is implemented using machine-executed program sequences, these sequences may be embodied in various forms of signal-bearing media. In the context of FIG. 3, this signal-bearing media may comprise, for example, the storage 304 or another signal-bearing media, such as a magnetic data storage diskette 400 (FIG. 4), directly or indirectly accessible by a processor 302. Whether contained in the storage 306, diskette 400, or elsewhere, the instructions may be stored on a variety of machine-readable data storage media.

Some examples include direct access storage (e.g., a conventional "hard drive", redundant array of inexpensive disks ("RAID"), or another DASD), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as assembly language, C, etc.

Logic Circuitry

In contrast to the signal-bearing medium discussed above, some or all of the invention's functionality may be implemented using logic circuitry, instead of using a processor to execute instructions. Such logic circuitry is therefore configured to perform operations to carry out the method of the invention. The logic circuitry may be implemented using many different types of circuitry, as discussed above.

Setting Up the Cache Lists

Figure 7:
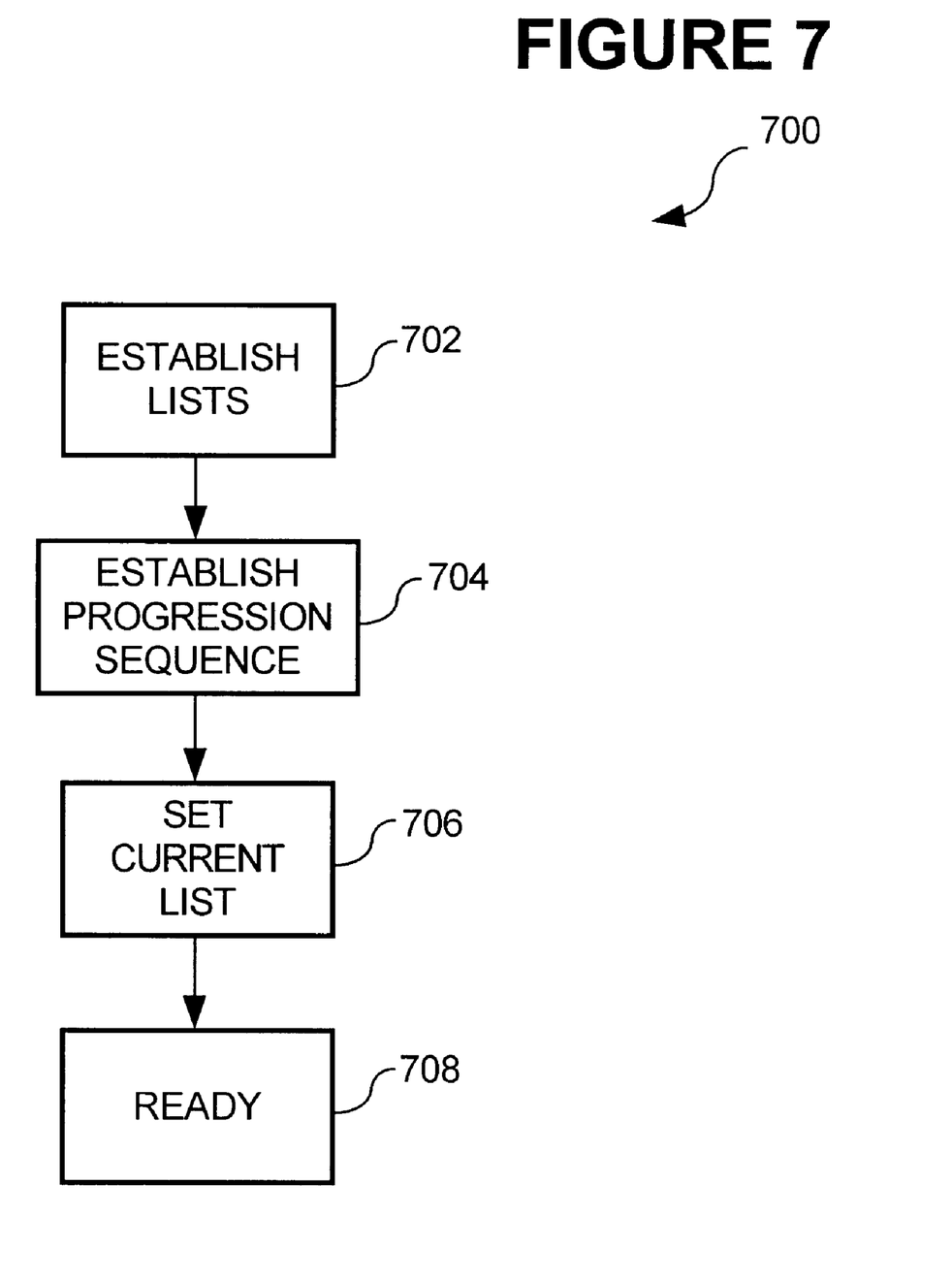
FIG. 7 is a flowchart of a cache list setup process of the invention.

FIG. 7 depicts a sequence 700 for setting up the lists 200. The sequence 700 may be performed, for example, when the subsystem 104 is initially set up, reconfigured, rebooted, installed, or another appropriate time. In step 702, the manager 108 creates the lists 200. For instance, step 200 may involve creating blank lists in storage space dedicated for the metadata 112, allocating storage space, opening files, etc.

In step 704, the manager 108 establishes the direction of progression 250 through the lists 200. The direction 250 may be established arbitrarily, according to pre-established considerations, by user input, or another basis. In step 706, the manager 108 designates the "current removal" list. In the example of FIG. 2, list 206 is the current removal list as shown by the current removal list marker 212. After step 706, the lists stand ready to receive cache list entries representing items of data in the cache 110.

As explained above, separate sets of lists 200 are utilized to manage demotion and destaging of cached data. Therefore, the sequence 700 may be performed once to establish lists for demotion, and repeated a second time to establish lists for destaging.

Adding Data to Cache

Figure 5:
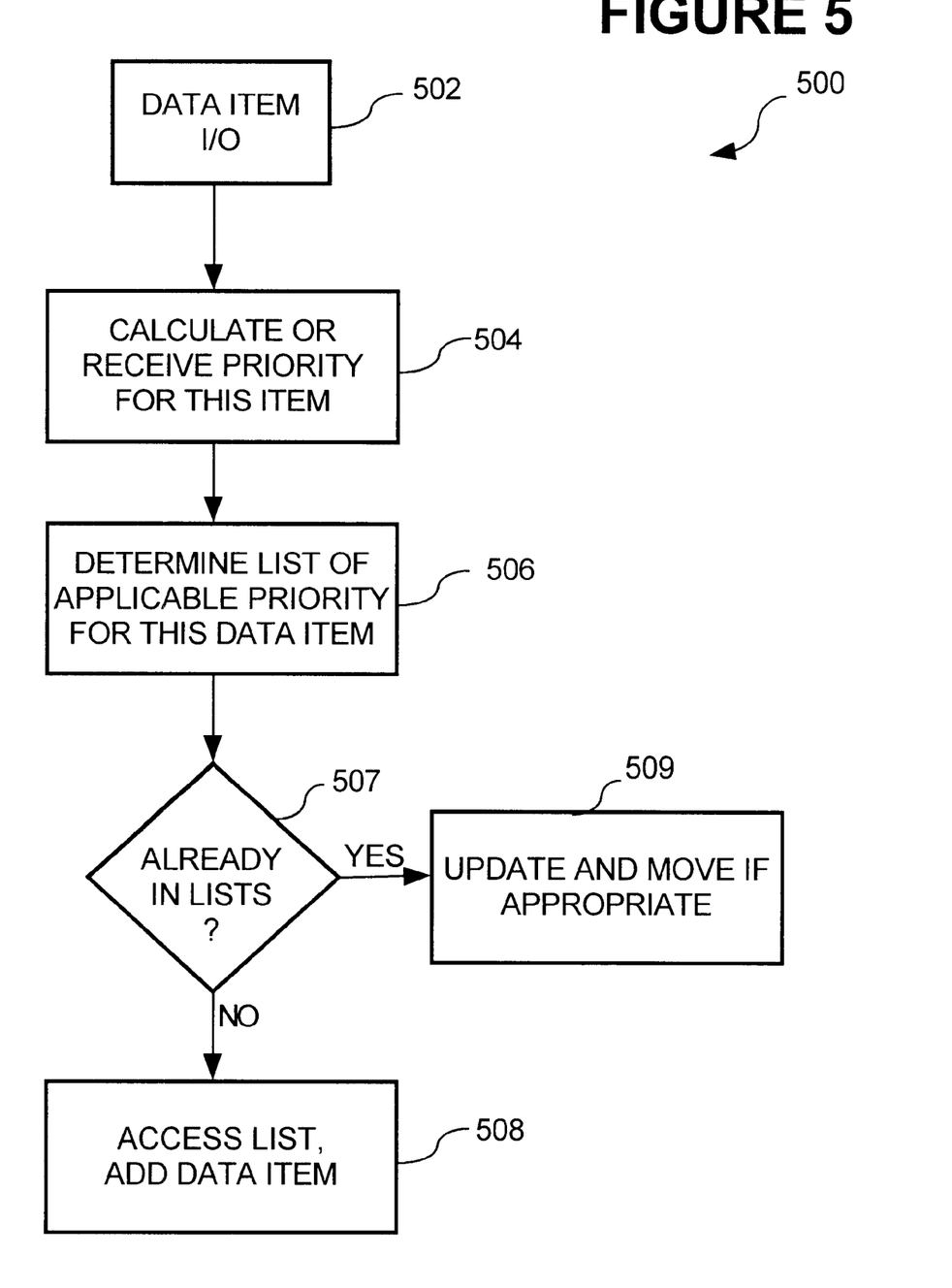
FIG. 5 is a flowchart of a cache list entry addition sequence according to the invention.

FIG. 5 depicts a sequence 500 of adding data to the cache lists 200. For ease of explanation, but without any intended limitation, the example of FIG. 5 is described in the context of the data storage system 100 described above. The sequence 500 is performed once for each set of destaging lists, and repeated separately for the demotion lists, albeit slightly differently as explained below. Briefly, the process of adding entries to the demotion cache lists seeks to maintain a set of cache lists that represent the data items contained in cache 110. In contrast, the process of adding entries to the destaging cache lists only seeks to maintain a set of cache lists representing the data items arriving in cache due to a cache Write hit or cache Write miss; data items read into cache due to cache Read miss are unrelated to destaging.

In step 502, the manager 108 performs some input/output (I/O) activity involving a data item in cache 110. This is referred to as the "current" data item, and may comprise a file, extent, logical construct, sector, physical device, address range, table space, or other storage space or data object. In the case where the lists 200 are implemented to support cache demotion, the activity of step 110 may include satisfying a host's Read request by reading the current data item from cache 110 ("cache Read hit"), satisfying a host Write request by writing the current data item into the cache 110 whether an existing version of the data exists in cache ("cache Write hit") or not ("cache Write miss"), satisfying a host's Read request by copying the data item from storage 116, 117 into cache 110 and to the host ("cache Read miss"), etc. As mentioned above, the process of adding entries to the demotion cache lists seeks to maintain a set of cache lists that represent the data items contained in cache 110.

In the case where the lists 200 are implemented to support cache destaging, the activity of step 502 comprises occurrence of a cache Write miss or cache Write miss, namely, the writing of data items into cache. As mentioned above, the process of adding entries to the destaging cache lists only seeks to maintain a set of cache lists representing data items written to cache, and which may accordingly require destaging at some point.

After step 502, the manager 108 calculates or receives a priority value for the current data item (step 504). The manager 108 recognizes a certain number of priority levels, namely, the same or one less than the number of lists 200. In the illustrated example, there are 15 different priority values (i.e., one through fifteen), which is one less than the number of lists 200. Data items with a higher priority value are treated differently than lower priority data items, as explained below. For instance, if the lists 200 are used to manage demotion of cached data items, then higher priority data items tend to last longer in cache than items of lower priority having the same LRU/LFU treatment, as explained below. Alternatively, if the lists 200 are used for destaging of cached data items, then higher priority data items are more frequently destaged to storage 116, 117 to protect them, or possibly less frequently destaged in order to avoid cache contention issues.

The selection of priority values depends upon whether the lists 200 are used for demotion or destaging. Priority values value may come from the host 102, from a user or customer, from an I/O channel, or from another source. Alternatively, the manager 108 may consider various facts to determine the priority value itself. For instance, it is typically undesirable to place data from large sequential jobs (such as backups) in cache for long. Thus, in the case of demotion, if the manager 108 determines the subject data item is part of a sequential job, the manager 108 may assign a low priority value to ensure early demotion from cache. As another example, where the manager 108 can distinguish between customer data and internal or housekeeping data, the manager 108 may assign a higher priority value for customer data. Ordinarily skilled artisans will also recognize a variety of other considerations for assigning priority values.

After step 504, the manager 108 selects the list 200 that is appropriate to contain a cache list entry corresponding to the current data item (step 506). If the lists 200 are being used to manage demotion, the manager 108 selects the list spaced in the sequence 250 beyond the current removal list 212 by the data items' priority value; thus, lower priority entries are inserted in lists that will come up earlier in the sequence 250 and therefore demoted earlier.

The following provides a more specific example of list selection for demotion. If the current data item's priority value is "one," the manager 108 adds the cache list entry into the list 208. If the current data item's priority value is "thirteen," the manager 108 adds the cache list entry into the list 210. If the current data item's priority value is "fifteen," the manager 108 adds the cache list entry into the list 204. In the illustrated example, cache list entries are not added to the current removal list, in order to avoid contention between the addition process 500 and demotion process 600 or destaging process 650 as applicable.

In the case where the lists 200 are used to manage destaging, the manager 108 uses a different approach to select the proper list for adding the current cache list entry. Namely, the manager 108 selects the list spaced beyond the current removal list, opposite in the sequence 250, by the data item's priority value. Thus, higher priority entries are made to lists that will be taken up earlier in the sequence 250, and therefore preserved by writing them to nonvolatile storage sooner. Alternatively, cache list entries may be added to the destage lists 200 on the same basis as demotion (described above), this approach adding cache list entries to lists spaced ahead of the current removal lists in proportion to the cache list entries' priorities. This approach, delays destaging of important data items and instead reduces their contention in cache, although they are not preserved by writing to storage as soon.

After step 506, the manager 108 reviews the cache lists 200 to determine whether the lists 200 already contain an entry for the current data item (step 507). If so, the manager 108 updates the data item's existing entry to reflect the recent I/O of step 502. For instance, if the cache lists 200 constitute LRU lists, step 509 enters the data item's access time into the list (e.g., TABLE 1). If a cache list entry exists but it is not in the list identified in step 506, the manager 108 moves the entry to the identified list in step 509. On the other hand, if the lists 200 do not already contain a cache list entry for the current data item, step 507 advances to step 508, where the manager 108 adds a cache list entry for the current data item into the selected list. In either case (step 508 or 509), the cache list entry is made to preserve order within each list from most recently used to least recently used (or most frequently used to least frequently used), either by preserving the relative order of entries or by supplying sufficient information in the cache list entry from which LRU/LFU statistics may be discerned. In the case of LRU or LFU lists where cache list entries contain data specifying their "time of recent use" or "frequency of use", the cache list entry's order of insertion relative to other entries is unimportant, since cache list entries are distinguished based upon their recency/frequency of use. Alternatively, where LRU lists are utilized and the relative order of cache list entries indicates the relative times of recent use rather than any content of the cache list entries themselves, the point of inserting the newly added cache list entry is important. In this case, the cache list entry is added at the current pointer or other place marker such as 202a–210a.

The contents of the cache list entry may vary from application to application, one example having been discussed above in TABLE 1. The manager 108 may lock the selected cache list prior to adding the cache list entry, and release the lock after adding the cache list entry.

Demotion

Figure 6A:
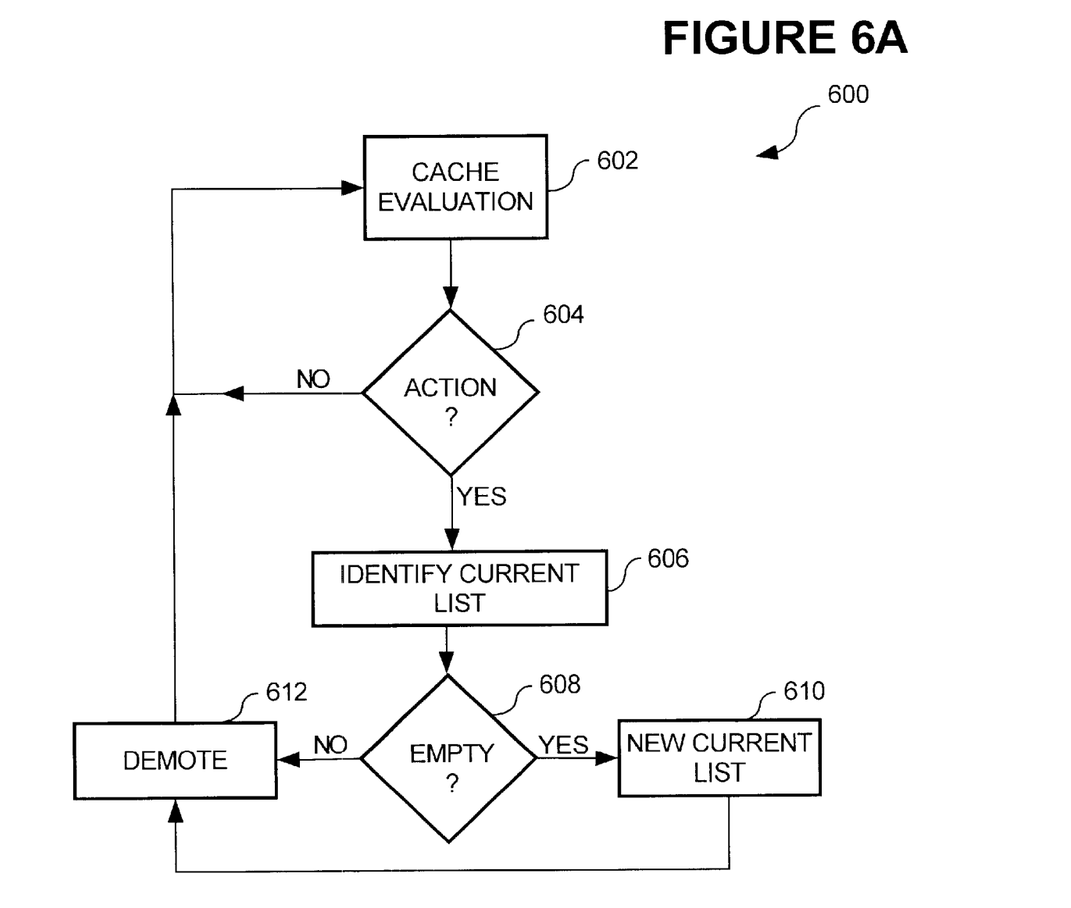
FIG. 6A is a flowchart of a demotion sequence, according to the invention.

FIG. 6A depicts a sequence 600 for demoting data items from the cache 110 and removing their representative cache list entries from the lists 200. For ease of explanation, but without any intended limitation, the example of FIG. 6A is described in the context of the data storage system 100 described above. In step 602, the manager 108 detects a predetermined cache evaluation event, which triggers a review of the cached data entries. The cache evaluation events may comprise periodic or other scheduled events, requests from an operator or host or other source, or they may arise responsive to certain conditions in the system 100.

Responsive to the event of step 602, the manager 108 determines whether there is a need to demote any entries from cache 110 (step 604). For example, step 604 may deem it necessary to demote entries from cache 110 if the amount of cached data exceeds a prescribed threshold, the cache 110 runs out of storage space, the size of all of any one list 200 exceeds a prescribed threshold, etc. If demotion is not necessary, step 604 returns to step 602.

On the other hand, if demotion is warranted, step 604 advances to step 606, where the manager 108 identifies the current removal list. In the present example, the list 206 is the current removal list, as identified by the current removal list marker 212. Next, the manager 108 reviews the current removal list to determine whether it is empty (step 608). If empty, the manager 108 designates the next list (in the progression 250) to be the current removal list, and adjusts the marker 212 appropriately (step 610).

If step 608 finds the current removal list to be non-empty, however, the manager 108 removes one or more cache list entries from the current removal list (step 612). Step 612 also removes the data items represented by these entries from the cache 110. In the illustrated example, step 612 demotes a single cached data item (and removes its cache list entry), although multiple cached data items may be demoted in batch if desired. For instance, a predetermined number of multiple cached data items may be demoted (and cache list entries removed) each time step 612 is performed, or a number of cached data items proportional to cache fullness, etc. In a different example, step 612 continues to demote cached data items until the amount of cached data falls below a prescribed threshold. To help preserve consistency, the manager 108 may lock the current removal list prior to step 612 and release the lock after step 612. After step 612, control returns to step 602 to await the next cache evaluation event.

Destaging

Figure 6B:
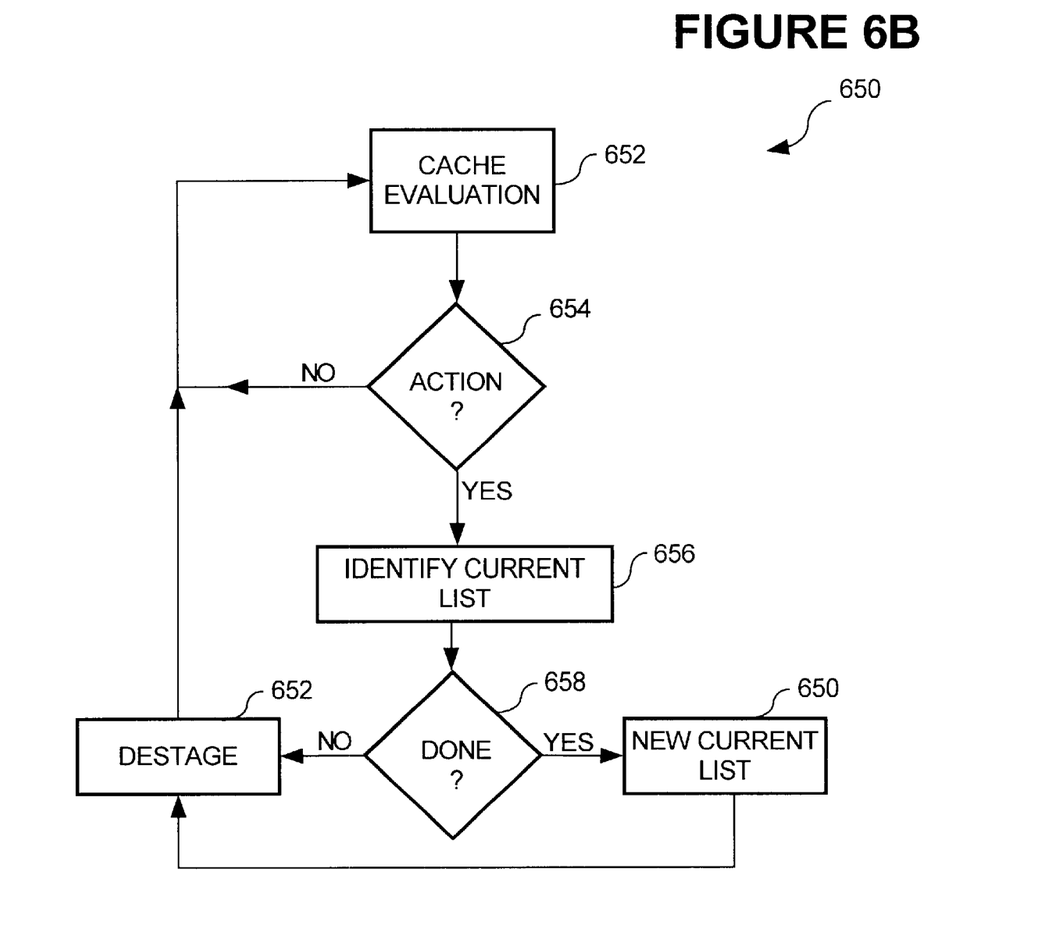
FIG. 6B is a flowchart of a destaging sequence, according to the invention.

FIG. 6B depicts a sequence 650 for destaging data items from the cache 110. Destaging involves preserving cached data by writing it to the storage 116, 117. For ease of explanation, but without any intended limitation, the example of FIG. 6B is described in the context of the data storage system 100 described above. In step 652, the manager 108 detects a predetermined cache evaluation event, which triggers a review of the cached data entries. The cache evaluation events may comprise periodic or other scheduled events, requests from an operator or host or other source, or they may arise responsive to certain conditions in the system 100.

Responsive to the event of step 652, the manager 108 determines whether circumstances dictate that destaging should occur (step 654). For example, step 654 may deem it necessary to destage entries from cache 110 if activity in the cache 110, storage 116, and/or storage 117 falls below a prescribed level. Another occasion is if there is an excessive amount of data in cache 110 that has not been copied to storage 116, 117. If there is no need for destaging, step 654 returns to step 652 to await the next cache evaluation event.

On the other hand, if destaging is warranted, step 654 advances to step 656, where the manager 108 identifies the current removal list by referring to the current removal list marker 212. Next, in step 658 the manager 108 reviews the current removal list to determine whether this list has been completely processed. For instance, the manager 108 may review the current removal list to determine whether it has considered all entries in the current removal list for possible destaging, this condition also being satisfied if the list is empty, if all entries have been flagged, etc. If the current removal list has been completely processed, the manger 108 designates the next list (in the progression 250) to be the current removal list, and adjusts the current removal list marker appropriately (step 650).

If step 658 finds the current removal list to be non-empty, however, the manager 108 reviews at least one cache list entry of the current removal list to determine whether its counterpart data item has resided in cache for an excessive amount of time (step 652). The measure of "excessive" may constitute a predetermined time (e.g., 2 minutes, 10 minutes, 1 day, etc.), an amount that varies depending upon various properties of the data (e.g., 2 minutes for customer data and 10 minutes for non-customer data, etc.), or other measure. In the illustrated environment, this inquiry is made by comparing the current time with "time when destaged" (TABLE 1) for that cache list entry. If proper, the manager 108 destages the data item corresponding to the cache list entry under review. Destaging involves copying the data item to an appropriate location in storage 116, 117. The data item is retained in cache 110, however, since the need to retain or demote data from cache is an independent inquiry from that of destaging. The data item's cache list entry is deleted, however, since this data item has now been destaged. To help preserve consistency, the manager 108 may lock the current cache list prior to step 652 and release the lock after step 652. After step 652, control returns to step 652 to await the next cache evaluation event.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for managing contents of a cache, comprising operations of:

establishing a multiple number of cache lists for storage of cache list entries each cache list entry naming a data item in the cache;

designating a sequence and direction of progression through the cache lists;

initially designating one of the cache lists as a current removal list;

processing the cache lists by performing one of the following:

a) performing demotion operations comprising: responsive to each occurrence of a predetermined demotion-evaluation condition, selecting at least one entry from the current removal list, evaluating the selected entry, and if the selected entry satisfies predetermined demotion criteria, removing the selected entry from the current removal list and purging the cache of each data item represented by the removed entry;

b) performing destaging operations comprising: responsive to each occurrence of a predetermined destaging-evaluation condition, selecting at least one entry from the current removal list, evaluating the selected entry, and if the selected entry satisfies predetermined destaging criteria, removing the selected entry from the current removal list and destaging each data item represented by the selected entry, said destaging occurring from the cache to prescribed nonvolatile storage;

designating a next list in the sequence from the current removal list whenever the current removal list becomes empty;

responsive to predetermined types of activity of a data item in the cache, performing operations to add a cache list entry naming the data item into one of the cache lists, the operations comprising determining a priority ranking of the data item, adding a cache list entry naming the data item said addition being made into one of the lists spaced in the sequence of progression beyond the current removal list by a number representative of the priority ranking.

2. The method of claim 1, where:

the demotion-evaluation condition comprises one of the following: fullness of the cache reaching a prescribed level, size of the lists exceeding a prescribed threshold, the cache having input/output activity below a prescribed level;

the destaging-evaluation condition comprises one of the following: the cache containing an amount of undestaged data exceeding a prespecified threshold, the cache having input/output activity below a prescribed level.

3. The method of claim 1, the predetermined demotion criteria comprising one of the following:

the data item named by the selected entry being a least recently used data item in the cache;

the data item named by the selected entry being a least frequently used data item in the cache.

4. The method of claim 1, the predetermined destaging criteria comprising:

a data item named by the selected entry having resided in the cache for a time exceeding prescribed criteria without destaging.

5. The method of claim 1, where the demotion operations are conducted such that the operation of selecting one or more entries from the current removal list comprises selecting one or more cache list entries naming data items of least recent use in the cache.

6. The method of claim 1, the demotion operations performed such that the predetermined types of activity include addition of a data item into the cache and reading of a data item from the cache.

7. The method of claim 1, the destaging operations performed such that the predetermined types of activity include writing of a data item to the cache.

8. The method of claim 1, the operation of determining the priority ranking comprising utilizing a scale having one less level than the number of the cache lists, where the operation of adding cache list entries restricts addition to lists that are not the current removal list.

9. The method of claim 1, the operation of determining the priority ranking comprising utilizing a scale having an equal number of levels as the number of cache lists.

10. The method of claim 1, the operation of adding a cache list entry comprising adding the cache list entry into one of the lists spaced in the direction of progression beyond the current removal list.

11. The method of claim 1, the operation of adding a cache list entry comprising adding the cache list entry into one of the lists spaced opposite the direction of progression beyond the current removal list.

12. A signal-bearing medium tangibly embodying a program of machine-readable instructions executable by a digital processing apparatus to perform operations for managing contents of a cache, the operations comprising:

establishing a multiple number of cache lists for storage of cache list entries each cache list entry naming a data item in the cache;

designating a sequence and direction of progression through the cache lists;

initially designating one of the cache lists as a current removal list;

processing the cache lists by performing one of the following:

a) performing demotion operations comprising responsive to each occurrence of a predetermined demotion-evaluation condition, selecting at least one entry from the current removal list, evaluating the selected entry, and if the selected entry satisfies predetermined demotion criteria, removing the selected entry from the current removal list and purging the cache of each data item represented by the removed entry;

b) performing destaging operations comprising responsive to each occurrence of a predetermined destaging-evaluation condition, selecting at least one entry from the current removal list, evaluating the selected entry, and if the selected entry satisfies predetermined destaging criteria, removing the selected entry from the current removal list and destaging each data item represented by the selected entry, said destaging occurring from the cache to prescribed nonvolatile storage;

designating a next list in the sequence from the current removal list whenever the current removal list becomes empty;

responsive to predetermined types of activity of a data item in the cache, performing operations to add a cache list entry naming the data item into one of the cache lists, the operations comprising determining a priority ranking of the data item, adding a cache list entry naming the data item said addition being made into one of the lists spaced in the sequence of progression beyond the current removal list by a number representative of the priority ranking.

13. The medium of claim 12, where:

the demotion-evaluation condition comprises one of the following: fullness of the cache reaching a prescribed level, size of the lists exceeding a prescribed threshold, the cache having input/output activity below a prescribed level;

the destaging-evaluation condition comprises one of the following: the cache containing an amount of undestaged data exceeding a prespecified threshold, the cache having input/output activity below a prescribed level.

14. The medium of claim 12, the predetermined demotion criteria comprising one of the following:

the data item named by the selected entry being a least recently used data item in the cache;

the data item named by the selected entry being a least frequently used data item in the cache.

15. The medium of claim 12, the predetermined destaging criteria comprising:

a data item named by the selected entry having resided in the cache for a time exceeding prescribed criteria without destaging.

16. The medium of claim 12, where the demotion operations are conducted such that the operation of selecting one or more entries from the current removal list comprises selecting one or more cache list entries naming data items of least recent use in the cache.

17. The medium of claim 12, the demotion operations performed such that the predetermined types of activity include addition of a data item into the cache and reading of a data item from the cache.

18. The medium of claim 12, the destaging operations performed such that the predetermined types of activity include writing of a data item to the cache.

19. The medium of claim 12, the operation of determining the priority ranking comprising utilizing a scale having one less level than the number of the cache lists, where the operation of adding cache list entries restricts addition to lists that are not the current removal list.

20. The medium of claim 12, the operation of determining the priority ranking comprising utilizing a scale having an equal number of levels as the number of cache lists.

21. The medium of claim 12, the operation of adding a cache list entry comprising adding the cache list entry into one of the lists spaced in the direction of progression beyond the current removal list.

22. The medium of claim 12, the operation of adding a cache list entry comprising adding the cache list entry addition into one of the lists spaced opposite the direction of progression beyond the current removal list.

23. A logic circuit of multiple interconnected electrically conductive elements configured to perform operations to manage contents of a cache, the operations comprising:

establishing a multiple number of cache lists for storage of cache list entries each cache list entry naming a data item in the cache;

designating a sequence and direction of progression through the cache lists;

initially designating one of the cache lists as a current removal list;

processing the cache lists by performing one of the following:

a) performing demotion operations comprising responsive to each occurrence of a predetermined demotion-evaluation condition, selecting at least one entry from the current removal list, evaluating the selected entry, and if the selected entry satisfies predetermined demotion criteria, removing the selected entry from the current removal list and purging the cache of each data item represented by the removed entry;

b) performing destaging operations comprising responsive to each occurrence of a predetermined destaging-evaluation condition, selecting at least one entry from the current removal list, evaluating the selected entry, and if the selected entry satisfies predetermined destaging criteria, removing the selected entry from the current removal list and destaging each data item represented by the selected entry, said destaging occurring from the cache to prescribed nonvolatile storage;

designating a next list in the sequence from the current removal list whenever the current removal list becomes empty;

responsive to predetermined types of activity of a data item in the cache, performing operations to add a cache list entry naming the data item into one of the cache lists, the operations comprising determining a priority ranking of the data item, adding a cache list entry naming the data item said addition being made into one of the lists spaced in the sequence of progression beyond the current removal list by a number representative of the priority ranking.

24. A data storage system, comprising:

a cache;

nonvolatile data storage;

metadata including a multiple number of cache lists for storage of cache list entries each cache list entry naming a data item in the cache, the lists having a designated sequence of progression there through, with one of the lists being initially designated as a current removal list;

a storage manager, coupled to the cache, data storage, and metadata, the storage manager programmed to manage contents of the cache by performing operations comprising:

establishing a multiple number of cache lists for storage of cache list entries each cache list entry naming a data item in the cache;

designating a sequence and direction of progression through the cache lists;

initially designating one of the cache lists as a current removal list;

processing the cache lists by performing one of the following:

a) performing demotion operations comprising responsive to each occurrence of a predetermined demotion-evaluation condition, selecting at least one entry from the current removal list, evaluating the selected entry, and if the selected entry satisfies predetermined demotion criteria, removing the selected entry from the current removal list and purging the cache of each data item represented by the removed entry;

b) performing destaging operations comprising responsive to each occurrence of a predetermined destaging-evaluation condition, selecting at least one entry from the current removal list, evaluating the selected entry, and if the selected entry satisfies predetermined destaging criteria, removing the selected entry from the current removal list and destaging each data item represented by the selected entry, said destaging occurring from the cache to the nonvolatile data storage;

designating a next list in the sequence from the current removal list whenever the current removal list becomes empty;

responsive to predetermined types of activity of a data item in the cache, performing operations to add a cache list entry naming the data item into one of the cache lists, the operations comprising determining a priority ranking of the data item, adding a cache list entry naming the data item said addition being made into one of the lists spaced in the sequence of progression beyond the current removal list by a number representative of the priority ranking.

25. A data storage system, comprising:

first means for caching data;

second means for nonvolatile digital data storage;

third means for storing metadata including a multiple number of cache lists for storage of cache list entries each cache list entry naming a data item in the cache, the lists having a designated sequence of progression therethrough, with one of the lists being initially designated as a current removal list;

storage manager means, coupled to the first, second, and third means, for managing contents of the cache by:

establishing a multiple number of cache lists for storage of cache list entries each cache list entry naming a data item in the first means;

designating a sequence and direction of progression through the cache lists;

initially designating one of the cache lists as a current removal list;

processing the cache lists by performing one of the following:

a) performing demotion operations comprising responsive to each occurrence of a predetermined demotion-evaluation condition, selecting at least one entry from the current removal list, evaluating the selected entry, and if the selected entry satisfies predetermined demotion criteria, removing the selected entry from the current removal list and purging the first means of each data item represented by the removed entry;

b) performing destaging operations comprising responsive to each occurrence of a predetermined destaging-evaluation condition, selecting at least one entry from the current removal list, evaluating the selected entry, and if the selected entry satisfies predetermined destaging criteria, removing the selected entry from the current removal list and destaging each data item represented by the selected entry, said destaging occurring from the cache to the second means;

designating a next list in the sequence from the current removal list whenever the current removal list becomes empty;

responsive to predetermined types of activity of a data item in the first means, performing operations to add a cache list entry naming the data item into one of the cache lists, the operations comprising determining a priority ranking of the data item, adding a cache list entry naming the data item said addition being made into one of the lists spaced in the sequence of progression beyond the current removal list by a number representative of the priority ranking.

* * * * *